US012002365B2

(12) United States Patent
Hilgers et al.

(10) Patent No.: US 12,002,365 B2
(45) Date of Patent: Jun. 4, 2024

(54) USER TERMINAL AND METHOD FOR SENDING FOR A TRANSPORTATION VEHICLE

(71) Applicant: VOLKSWAGEN AKTIENGESELLSCHAFT, Wolfsburg (DE)

(72) Inventors: Marian Hilgers, Berlin (DE); Isabelle Fröhlich, Potsdam (DE); Aaron Post, Berlin (DE); Daniel Palzer, Berlin (DE); Mark Lukas, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 234 days.

(21) Appl. No.: 16/491,207

(22) PCT Filed: Feb. 6, 2018

(86) PCT No.: PCT/EP2018/052860
§ 371 (c)(1),
(2) Date: Sep. 5, 2019

(87) PCT Pub. No.: WO2018/162159
PCT Pub. Date: Sep. 13, 2018

(65) Prior Publication Data
US 2021/0082287 A1 Mar. 18, 2021

(30) Foreign Application Priority Data
Mar. 6, 2017 (DE) .................... 10 2017 203 613.3

(51) Int. Cl.
*G08G 1/00* (2006.01)
*G01C 21/34* (2006.01)
(Continued)

(52) U.S. Cl.
CPC ......... *G08G 1/202* (2013.01); *G01C 21/3438* (2013.01); *G01C 21/3605* (2013.01); *H04W 4/40* (2018.02)

(58) Field of Classification Search
CPC ..... G08G 1/202; H04W 4/40; G01C 21/3438; G01C 21/3605
See application file for complete search history.

(56) References Cited

U.S. PATENT DOCUMENTS

2004/0093280 A1 5/2004 Yamaguchi
2008/0103686 A1* 5/2008 Alberth .................. G01C 21/00
701/532

(Continued)

FOREIGN PATENT DOCUMENTS

DE 102013013569 A1 2/2015
DE 202016004260 U1 8/2016

(Continued)

OTHER PUBLICATIONS

Kuhn; Method to represent progress/capacity with a 7-segment display; ip.com; Dec. 4, 2008.

(Continued)

*Primary Examiner* — Andrew R Dyer
*Assistant Examiner* — Stephanie T Su
(74) *Attorney, Agent, or Firm* — Barnes & Thornburg LLP

(57) ABSTRACT

A user terminal, a transportation vehicle, a server, a computer program product, a signal sequence and a method for sending for a transportation vehicle. The method includes receiving user input entered using an actuation device of a user terminal, sending a wireless message, assigning the transportation vehicle to the user terminal in response to the receipt of the wireless message, determining an expected arrival time and/or interval until the arrival of the transpor- (Continued)

tation vehicle at the user terminal, and displaying a waiting time determined based on the arrival time or interval by a number of luminescent light predefined for the display of the waiting time and/or a number per time unit of light to be activated or deactivated, and/or a position of a luminescent light of the user terminal.

12 Claims, 4 Drawing Sheets

(51) Int. Cl.
    *G01C 21/36*    (2006.01)
    *H04W 4/40*    (2018.01)

(56) References Cited

U.S. PATENT DOCUMENTS

| | | | | |
|---|---|---|---|---|
| 2011/0078934 | A1* | 4/2011 | McDougall | G09F 19/22 40/447 |
| 2016/0042303 | A1 | 2/2016 | Medina et al. | |
| 2017/0147959 | A1* | 5/2017 | Sweeney | G07C 5/008 |
| 2018/0087915 | A1* | 3/2018 | Marco | G06Q 50/10 |
| 2018/0096445 | A1* | 4/2018 | Eyler | G06Q 50/30 |
| 2019/0387060 | A1* | 12/2019 | Kentley-Klay | H04L 67/306 |

FOREIGN PATENT DOCUMENTS

| | | |
|---|---|---|
| DE | 102015209190 A1 | 11/2016 |
| JP | 2013002868 A | 1/2013 |
| JP | 2013235520 A | 11/2013 |
| WO | 2014020186 A1 | 2/2014 |

OTHER PUBLICATIONS

Anonymous; Visual countdown notification for scheduled calendar events; ip.com Journal; Jul. 3, 2012.

Eckt-Dorna; Google is looking for partners for its robot car; downloaded from http://www.manager-magazin.de/unternehmen/autoindustrie/autonomes-fahren-google-sucht-partner-fuer-roboterauto-in-autobranche-a-1009947.html; Dec. 22, 2014.

Search Report for International Patent Application No. PCT/EP2018/052860; Mar. 28, 2018.

\* cited by examiner

USER TERMINAL AND METHOD FOR SENDING FOR A TRANSPORTATION VEHICLE

PRIORITY CLAIM

This patent application is a U.S. National Phase of International Patent Application No. PCT/EP2018/052860, filed 6 Feb. 2018, which claims priority to German Patent Application No. 10 2017 203 613.3, filed 6 Mar. 2017, the disclosures of which are incorporated herein by reference in their entireties.

SUMMARY

Illustrative embodiments relate to a user terminal, a computer program product, a signal sequence and a method for sending for transportation vehicle. In particular, the illustrative embodiments relate to simple hardware for ordering transportation vehicles that can be used even by people who are not technically minded or by people with cognitive and sensory limitations who want to participate in road traffic.

BRIEF DESCRIPTION OF THE DRAWINGS

The exemplary embodiments are described below with reference to the accompanying drawings, in which.

DETAILED DESCRIPTION

Figure 1:
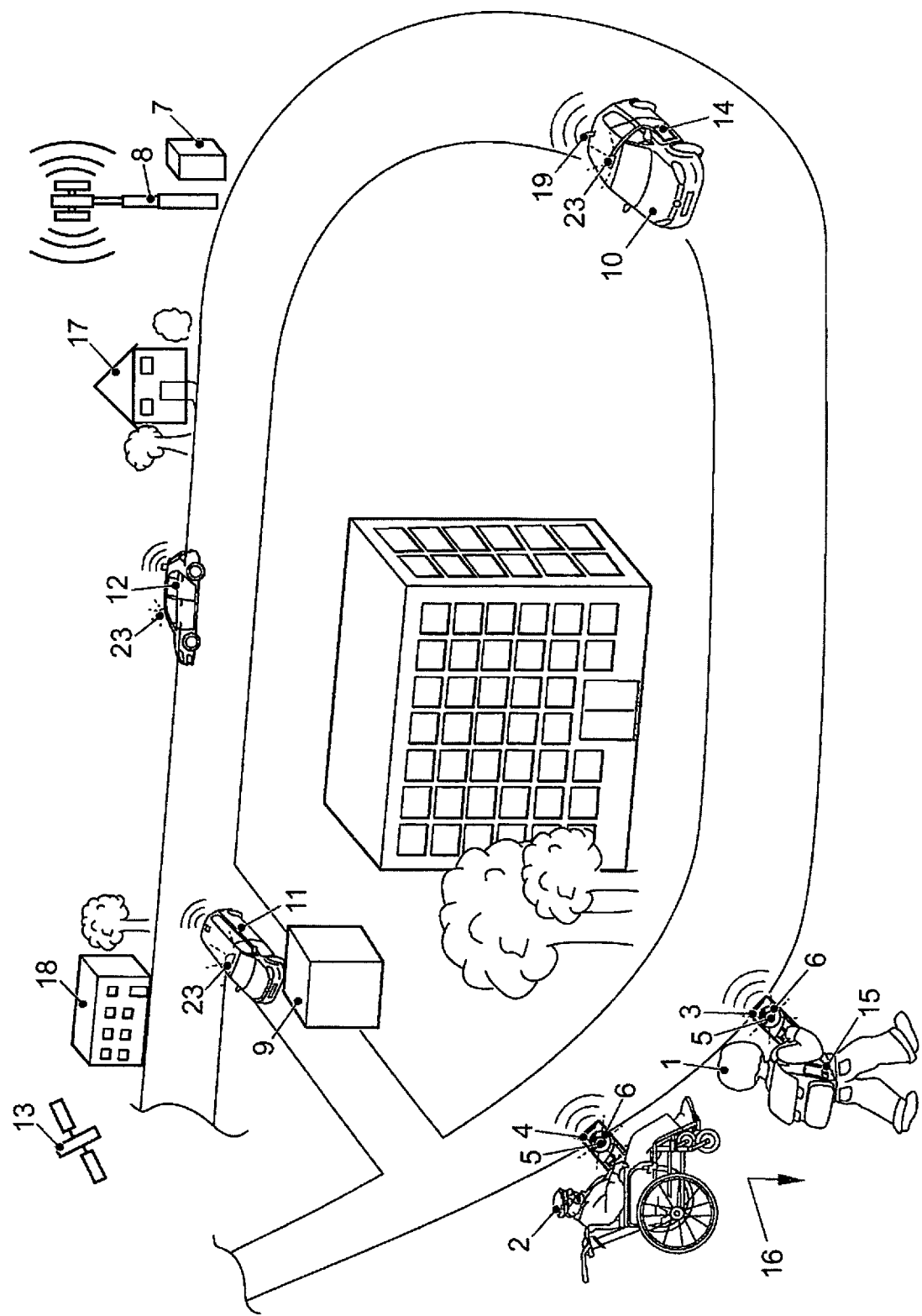
FIG. 1 shows a schematic depiction of a scenario in which two exemplary embodiments of a disclosed user terminal are used to send for two exemplary embodiments of disclosed transportation vehicles by using an exemplary embodiment of a disclosed server in an exemplary embodiment of a disclosed method.

An ever increasing traffic density has provided a boost to concepts whose aim is shared use of transportation vehicle by a large number of users. Rental cars, taxi service providers, car sharing pools and neighborhood transportation vehicles increase the average period of use of the respective transportation vehicle and therefore lower the traffic density, which saves energy resources and the environment. Many of the aforementioned concepts use conventional smartphones, on which appropriate applications ("apps") need to be installed to look for, reserve or order the transportation vehicles, to perform billing-related user operations, to make assessments of the transportation vehicle and to look for parking spaces at which the transportation vehicles can be received and later returned.

For a large number of potential users, smartphones are not suitable end user hardware. This is due firstly to the sometimes expensive purchase and expensive operation (data tariffs) of the smartphones. Secondly, for example, visually impaired and elderly people cannot make out information presented on the small displays, or can make it out only with difficulty. Also, the presentation of information by numbers and letters necessitates an appropriate educational background that is sometimes not present in fellow citizens from countries that speak a foreign language, for educationally deprived strata and children of preschool and primary school age. Ultimately, the traffic density is not lowered in the best possible way on the basis of the prior art.

DE 20 2016 004 260 U1 discloses a system for coordinating multiple vehicles used for ambulance services. To increase user convenience, transportation parameters are transmitted in digital form at the very time of ordering and the vehicle parameter sets are compared against the purpose of travel to ensure that the purpose is met.

DE 10 2015 209 190 A1 discloses a method for user-defined provision of a vehicle that involves a trajectory traveled on autonomously by a transportation vehicle within a parking facility (e.g., parking garage) being visually displayed on a smartphone display of a user.

Http://www.manager-magazin.de/unternehmen/autoindustrie/autonomes-fahre n-google-suchtpartner-fuer-roboterauto-in-autobranche-a-1009947.html discloses the concept of allowing users to order an automobile by smartphone app to be able to use the automobile as a taxi.

Disclosed embodiments alleviate or eliminate the aforementioned drawbacks of the prior art.

Disclosed embodiments provide a method for sending for a transportation vehicle. The transportation vehicle, which can be a passenger vehicle, transporter, truck, motorcycle, aircraft and/or watercraft, is also referred to later on as the "first transportation vehicle". To send for the transportation vehicle, a user operates an actuation device, e.g., of a piece of hardware according to the disclosure, which is also referred to as the "first user terminal" below. The user terminal can admittedly be a conventional smartphone. A form that is less complex and more robust in terms of hardware and software is optional. A screen can be dispensed with entirely, since the present disclosure allows a reduction in the optical communication between the user and the user terminal on the basis of individual light signals.

The operation of the actuation device, which can be a software or hardware button, results in a wireless message being transmitted by the user terminal. This wireless message can be sent directly to the transportation vehicle that is to be sent for, for example. This does not preclude a terrestrial mobile communication, a Wi-Fi hotspot or the like from being interposed. Additionally, there may also be a server interposed that can modulate the communication between the user terminal or many user terminals and the respective transportation vehicle or a multiplicity of transportation vehicle.

Optionally, the transportation vehicle sent for is assigned to the user terminal. In other words, the first transportation vehicle can be reserved for the user of the user terminal as part of the disclosed method. This involves the first transportation vehicle being logically linked to the first user terminal. This link is tied to a single purpose of travel (picking up the user at his current position and taking the user to his destination position) and can be canceled after the driving job has been done. Upon the assignment, an expectable time of arrival of the transportation vehicle at the user terminal is also ascertained according to the disclosure. This ascertainment can be effected in different entities.

By way of example, the aforementioned server can ascertain the length of time before the transportation vehicle arrives at the user terminal and can send corresponding information to the user terminal. Alternatively, the user terminal can be notified of the position of the transportation vehicle, as a result of which the user terminal, in light of its own position and of digital map material (optionally also on the basis of current traffic data), can independently ascertain the expectable time of arrival of the transportation vehicle. Finally, the transportation vehicle, in particular, a navigation system arranged in the transportation vehicle, can also ascertain the expectable time of arrival at the user terminal and send it either directly to the user terminal and/or to the server, which in turn sends corresponding time information to the user terminal.

The time information can denote an absolute time of day and alternatively or additionally a period of time (e.g., 15 minutes). To visually display the waiting time to the user in a striking manner regardless of his sensory or cognitive capabilities, a waiting time (also waiting period) ascertained on the basis of the time of arrival or length of time is depicted by a number of lit illuminants that is predefined for the display of the waiting time. In accordance with, e.g., an hourglass, each lit LED can represent a particular period of time, so that the sum of the lit illuminants shows the ascertained waiting time.

Alternatively or additionally, the waiting time can be displayed such that the number of illuminants to be switched off per unit time is defined. By way of example, all of the available illuminants provided for this purpose can be initially switched on and linearly switched off in succession completely until the expected waiting time has elapsed. In other words, the waiting time is initially evenly distributed over all of the illuminants and, after a first portion of the waiting time has elapsed, a first illuminant is switched off, after a second portion of the waiting time has elapsed, a second illuminant is switched off, etc.

Alternatively or additionally, a position of a lit illuminant of the user terminal can be varied on the basis of the ascertained waiting time. This option corresponds at times to an analog clock whose hand positions are symbolized by the illuminant positions. It is also possible for multiple positions of lit illuminants to be varied on the basis of the ascertained waiting time. By way of example, a first position can be marked by a first lit illuminant and a second position can be marked by a second lit illuminant. The first position can be varied relative to the second position such that the two positions are not congruent or identical until after the waiting time has elapsed. In this case, the first position may be fixed.

Alternatively or additionally, both positions can be varied and "meet" at a predefined third position after the ascertained waiting time has elapsed. By way of example, both positions can have a linear or circular trajectory in opposite directions. The illuminants can be arranged in a non-matrix-like state in relation to one another and may be configured not to represent numbers and/or letters. Further, it is possible for the illuminants not to be configured to display predefined and/or random shapes and/or symbols. For a visually appealing design, ramped driving of the LEDs can ensure that gentle transitions are produced between lit and unlit areas of the light. In this manner, it is also possible for the waiting time to be displayed by the simplest hardware and almost without software and hence set up in an extremely robust state. Ultimately, small children, pensioners and other people can conveniently access transportation vehicle without having to carry a smartphone or decipher/understand information presented on a display of a smartphone.

The transportation vehicle can initially be selected from a multiplicity of transportation vehicle that have been logically linked to the user terminal and/or a server to begin with. The server can be the server of a service provider/taxi company, etc. Accordingly, the user terminal can also be linked to the server, so that an identity of the owner of the user terminal as well as, e.g., payment methods and contact data are stored on the server without these necessarily having to have been stored by the user terminal. Instead, the information linked to the user terminal, which information is required for picking up and transporting the user, can have been defined at an earlier time by a smartphone, a tablet, a PC or the like.

The transportation vehicle can have been selected from a multiplicity of transportation vehicle on the basis of position in the conventional manner to allow a shortest possible journey to the user and hence a shortest possible waiting time for the user. This increases the convenience of the user and reduces emissions produced for the journey to the user.

If the method described above is meant to support a multiplicity of different user positions, it is initially possible for position determination for the first user terminal to be prompted. This can be effected, for example, by evaluating Wi-Fi hotspots, terrestrial mobile radio signals and/or signals transmitted on a satellite basis. Provided that the user carries a smartphone, the position determination can be effected, for example, by the smartphone, and a short range radio connection (BLUETOOTH®, BLUETOOTH® LE) can be used to send the coordinates of the user to the transportation vehicle, the server or initially to the first user terminal. In other words, the ascertained position (actual position) of the user terminal is transmitted as a wireless message and used by the first transportation vehicle as a starting location on the route to be traveled with the user. This does not preclude the user terminal from being able to contain a data memory defining a multiplicity of predefined starting positions.

Actuation patterns associated with the different starting positions can be used by the user to transmit a respective starting location to the transportation vehicle by the actuation device. By way of example, a simple push of a key can denote pickup at the home address, while a double click prompts a pickup at the kindergarten. A long press in turn can prompt a pickup at the retirement home or another facility. In this manner, different ways of defining a starting position for the route to be traveled can be chosen.

To keep the user terminal as simple as possible in terms of hardware and to preclude user error, there can be provision for destinations to be able to be written to a memory of the user terminal by a smartphone, a PC or a tablet. To this end, for example, a wireless exchange of information or an electrical connection to the user terminal can be set up. One option for an electrical connection is a USB or Firewire connection, which can be connected to a PC. In one of the aforementioned ways, it is also possible for a period (e.g., a time of day, in particular, on the basis of a day of the week) to be stipulated within which the user terminal for the journey to a particular destination is predefined.

If it is subsequently automatically ascertained that the user terminal is in the first transportation vehicle sent for, the predefined destination is automatically traveled to without the user needing to prescribe a destination position for the first transportation vehicle. Instead, the first transportation vehicle reads where the journey is meant to go from a memory of the user terminal or from an internet-based/server-based profile. This has the benefit that the user (in particular, a child/a pensioner/a passenger who is compos mentis only to a limited degree) cannot travel to a different destination than the one defined by a responsible person (e.g., parent or guardian).

By way of example, the user terminal can be handed over to the user, or attached to him, without a destination definition. The guardian can use a smartphone, a PC or the like to predefine the destination position that currently needs to be traveled to on the server/in a cloud, and in so doing he links an identifier/profile of the user terminal to the new destination. As soon as the first transportation vehicle reads the identifier from the user terminal, the transportation vehicle can ask the server/cloud whether an updated destination position has been predefined for the user terminal or whether a destination predefined generally on the basis of a current time of day/current date is to be traveled to. In a corresponding manner, it is also possible for times of day/days of the week, etc., to be predefined for which the user (e.g., with a sensory or cognitive impediment) is authorized to define destination positions of his own or to negotiate the destination positions with the driver of the transportation vehicle.

A particularly robust, energy-saving and visually appealing form of the user terminal is rendered possible by the use of a multiplicity of LEDs as illuminants, which are driven to transmit the light and to display the waiting time. The LEDs can be arranged in a line, in a circle or in an oval shape or the like. The LEDs can surround, optionally encircle, the actuation device. In this way, a user can locate and use the actuation device without any problems even when visibility is poor. The multiplicity of LEDs can have, for example, an optical diffuser that renders it difficult to make out the individual illuminant/LED or prevents this entirely.

If changes to the route planning of the transportation vehicle or traffic flow changes arise during the journey to the user terminal, an update to the expected time of arrival can be taken as an opportunity to also adapt (update) the waiting time visually displayed by the user terminal. In other words, the number of currently lit illuminants or the illuminants of the user terminal that are to be switched off per unit time or the position of the currently lit illuminant can be adapted on the basis of an updated expectable waiting time. Optionally, the user can be informed about the update.

By way of example, a signal tone and/or a vibration pattern and/or a flash signal and/or a color change indicator can indicate that the hitherto expected time of arrival of the transportation vehicle has changed on account of current circumstances. So as not to upset the user, it is possible, if the waiting time is shown by a number of illuminants to be switched off per unit time, for the updated waiting time to be split over the illuminants that have currently remained lit and for the illuminants that have remained lit therefore to be switched off (depending on the updated waiting time) in speeded up and/or slowed down state in succession until the updated waiting time has elapsed. When the disclosed embodiment involve a reference to switching off the illuminants until the waiting time has elapsed, it is naturally clear to a person skilled in the art that the expectable waiting time can also be shown by switching on the illuminants at successive times, so that, after the waiting time has elapsed, all of the illuminants of the disclosed user terminal that are fundamentally provided for this purpose spill light. Corresponding subjects can therefore likewise be understood as being covered by the subject of the appended claims.

The updating of the expectable time of arrival or length of time is—as described above—usually associated with not inconsiderable signaling complexity that uses the energy resources of the disclosed user terminal and a data tariff of the user that may have been provided for this purpose. To keep down the complexity of the update, it is proposed to update the expected time of arrival at predefined intervals of time. Alternatively, or additionally, an event-based update of the expected time of arrival/length of time can take place. By way of example, after a predefined percentage of the originally ascertained waiting time has elapsed, a request can be sent to the server or the entity ascertaining the time of arrival.

Alternatively or additionally, a fixed, predefined period before the ascertained waiting time elapses can be ascertained and, in response, a request to update the expected time of arrival or length of time can be sent. In response to receiving the request, the transportation vehicle or the server can initiate a fresh route calculation or can ascertain an otherwise updated expected time of arrival and send it to the user terminal. In this manner, the user is informed about the ever current expectable time of arrival/waiting time with little expenditure of energy and complexity of data communication.

The disclosed method is possible to distinguish between such transportation vehicle and user terminals as are used in physical proximity to one another. An example is shown by an exemplary embodiment of the disclosed method as follows: first of all, a first user terminal as described above is used to send for a first transportation vehicle. Additionally, a second user terminal is used to send for a second transportation vehicle. The second user terminal can also send a wireless message directly to a second transportation vehicle and/or to a predefined server (e.g., the server described above), in response to which the second transportation vehicle is assigned to the second user terminal. To make the transportation vehicle distinguishable for the waiting users, the second transportation vehicle and the second user terminal are also assigned second color information, which is different than the first color information. As described above, the second transportation vehicle is then also prompted to transmit light defined by the second color information. The second user terminal is also prompted to transmit light, the color of which is defined by the second color information and is substantially identical to the color of light emitted by the second transportation vehicle.

On the basis of the number of potential users, the use of the available color space will possibly make it difficult to distinguish between the colors of the first color information and the second color information. Optionally, respective position information of the first user terminal and of the second user terminal can therefore be compared with one another. Provided that the positions of the two user terminals differ from one another to a sufficiently great extent (the users are, e.g., arranged in different streets or even in different neighborhoods), there is no fear of the respectively approaching transportation vehicle being mixed up, even if identical colors are used. In response to a predefined physical relationship (proximity) between the two user terminals, however, the second color information can be chosen such that a predefined minimum color interval from the first color information is observed.

By way of example, different primary colors can be defined by the first and second color information, as a result of which there is no risk of a mixup in the event of the first user and the second user waiting for their respective transportation vehicle next to one another (e.g., at the exit of a fair, of a kindergarten or the like). The avoided risk of a mixup can equally often lead to an improvement in the service. On the one hand, it is possible to ensure that a first transportation vehicle sent for by a first user at a first time is not mistakenly boarded by a second user who had not ordered his second transportation vehicle until a later second time. On the other hand, a possibly predefined desired configuration for the transportation vehicle can be better matched to the needs of the respectively waiting user. If, for example, a kindergarten child needs a seat raiser or a child seat that is not carried by another transportation vehicle, the users mixing up the approaching transportation vehicles can defeat the purpose of travel. An adequate color interval (at least on an assumption of a physical proximity between the first user and the second user) thus allows the service of the transportation vehicle or of their operator to be made fairer and more convenient.

To allow identification of the approaching first transportation vehicle by the user as early and accessibly as possible, first color information can be assigned to the first user terminal and to the first transportation vehicle assigned thereto. By way of example, a wireless message containing the first color information can be sent to the first transportation vehicle. This can be effected by the user terminal or by a server. Accordingly, a wireless message containing the first color information can be sent to the first user terminal (e.g., by the server or the transportation vehicle). Transmission of light of a color corresponding to the color information allows the use to user a user terminal to ascertain which approaching transportation vehicle is assigned to him or his user terminal. To this end, the user can first of all spot the light transmitted by the user terminal and subsequently scan the surroundings for the transportation vehicle emitting light of the same color. The user can hold the user terminal in the direction of the approaching transportation vehicle to be able to compare the shades with one another particularly well. Letters need be neither deciphered nor understood to identify the transportation vehicle, e.g., on the basis of a license plate. When it is dark, the light transmitted by the transportation vehicle can easily be detected from afar, which means that the user can possibly change the side of the road to board as early as possible.

When the present disclosure involves "light of a predefined color" being referred to, this may also be intended to be understood to mean a predefined temporal color profile, a predefined temporal intensity profile and/or a predefined spatial light distribution pattern that can be reproduced as appropriate both by the user terminal of the user and by the transportation vehicle. It goes without saying that the light transmitted for identification on the basis of the color information can be or add to that emitted by the disclosed user terminal to show the waiting time.

According to a second disclosed embodiment, a user terminal that can be used in a method described above is proposed. The user terminal can be a smartphone, handheld transmitter or the like. A robust, low-volume and inexpensive hardware configuration can be chosen that has an actuation device, a position ascertainment device, a transmission/reception device and an evaluation unit (e.g., a microcontroller, a programmable processor or the like). Additionally, there is provision for illuminants that can spill light of a predefinable color. The evaluation unit is configured to accept a user input in conjunction with the actuation device (e.g., a pushbutton). By the user input, the user of the disclosed user terminal expresses the desire to send for a transportation vehicle from a predefined pool of transportation vehicle. The transmission/reception device (e.g., comprising an antenna) is configured to respond to the user input in conjunction with the position ascertainment device by transmitting a wireless message to send for a first transportation vehicle. The wireless message can be sent to a server, for example, that takes on the mediation between the user terminal and the transportation vehicle. Also, the transmission/reception device is configured to obtain/receive an acknowledgement of an assignment of the first transportation vehicle to the first user terminal and optionally first color information. This acknowledges that the first transportation vehicle is following the call by the first user terminal and is not attending to other passengers.

The disclosed user terminal is configured to ascertain an expectable time of arrival or length of time before the transportation vehicle arrives at the user terminal. To this end, the user terminal can independently compare a position of its own and a current position of the transportation vehicle with one another and (e.g., in conjunction with digital map material and/or traffic flow analysis data) ascertain the expectable time of arrival. This process can alternatively or additionally take place on a server and/or in the expected transportation vehicle. Alternatively or additionally, the user terminal can be configured to receive a wireless message (from the transportation vehicle and/or from the server) and to ascertain therefrom the expectable time of arrival or length of time before the transportation vehicle arrives. On the basis of the current time of day, the waiting time for the user can then be ascertained, this being shown by using an appropriate number of lit illuminants in the user terminal. In other words, the predefined number of illuminants is electrically driven.

Alternatively or additionally, the waiting time can be shown by a number of illuminants to be switched on per unit time (e.g., starting from all of the illuminants provided for this purpose being driven) or a number of illuminants to be switched on per unit time (starting from a state in which all of the illuminants provided for this purpose are off).

Alternatively or additionally, a predefined position of a single illuminant or of a predefined (in particular, invariable) group of illuminants can be used to display the waiting time in accordance with a hand of a clock.

On the basis of the received color information, the illuminant can also be configured to transmit light whose color is defined by the color information, as a result of which a visual association is made between the user terminal and the transportation vehicle. In summary, the user terminal is configured to respond to the sending of a wireless message to a driving service by being assigned time information denoting a waiting time by the driving service and displaying the waiting time before the transportation vehicle arrives by a predefined time response of individually driven LEDs. Provided that the assigned transportation vehicle is notified of the same color information, the disclosed user terminal in conjunction with the transportation vehicle can bring about the same features, combinations of features and benefits as have been explained in conjunction with the aforementioned method.

According to a fifth exemplary embodiment, a computer program product is proposed that has instructions that, when executed on an evaluation unit of an exemplary user terminal according to the second embodiment that is mentioned, prompt the evaluation unit to carry out the disclosed method according to the first embodiment that is mentioned. The computer program product can be a CD, a DVD, a flash memory, a ROM/RAM, a Blu-ray disc, etc.

According to a sixth disclosed embodiment, a signal sequence is proposed that represents instructions that, when executed on an evaluation unit of a disclosed user terminal according to the second embodiment that is mentioned, prompt the evaluation unit to carry out the disclosed method according to the first embodiment that is mentioned. In this manner, protection is provided for the provision of instructions representing the disclosed method even in the event of the data memories required for permanently storing the instructions being arranged outside the scope of the accompanying claims.

FIG. 1 shows a schoolchild 1 as a first user, who would like to use a transportation vehicle 10 with autonomous driving capability to travel to his accommodation 17 as destination, and a pensioner 2 as a second user, who would like to send for a manned ambulance 11 suitable for wheelchairs to travel to a retirement home 18 as destination, at a position 16. The schoolchild 1 has coupled a smartphone 15 to a user terminal 3 according to the disclosure by BLUETOOTH®, the smartphone 15 being capable of determining the current position of the schoolchild 1 using a satellite 13. By the coupling, the user terminal 3 is also informed about the current position 16 of the schoolchild 1. To send for the autonomously driving transportation vehicle 10, the schoolchild 1 pushes a button 5 as an actuation device of the user terminal 3, in response to which the latter sends a wireless message via a transmission mast 8 to a server 7 provided by the operator of the transportation vehicle 10, 11, 12. The server 7 ascertains that the transportation vehicle 10 is closest to the schoolchild 1 and in a form suitable for performing the driving job. Additionally, the server 7 ascertains the route on which the transportation vehicle 10 will drive to the schoolchild 1 and what journey time can be estimated therefor.

Optionally, current traffic data/traffic flow data can also be accessed in the process. The ascertained journey time is subsequently sent by a wireless message from the server via the transmission mast 8 to the user terminal 3 of the schoolchild 1, which responds thereto by driving individual LEDs of the illuminant 6 to produce a display representing the waiting time. By way of example, a decreasing number of lit illuminants is used in this case, in accordance with FIGS. 3 to 6, to signal to the schoolchild 1 the latest time at which he needs to (re)appear at the position 16 and board the transportation vehicle 10. A short time afterward, the server 7 receives from the user terminal 4 of the pensioner 2 the request to send an ambulance 11, the user terminal 4 having ascertained the current position of the pensioner 2 independently (by a position ascertainment device, not depicted) by using the satellite 13 and having included corresponding information in the wireless message to the server 7. For the ambulance 11 too, a suitable route and an expected time of arrival are calculated by the server 7 on the basis of digital map material and optionally by using traffic data/traffic flow data and sent via the transmission mast 8 to the user terminal 4 of the pensioner 2. Individual LEDs within the illuminant 6 are subsequently used to show the pensioner 2, by variable positions of two LEDs, in accordance with FIGS. 7 to 10, when the ambulance 11 will arrive at the pensioner 2.

The server 7 moreover also ascertains the predefined physical proximity between the schoolchild 1 and the pensioner 2, infers therefrom a risk of mixup in the event of the approaching transportation vehicles 10, 11 being provided with similar color information to one another, and looks for color information for the ambulance 11 that differs sufficiently distinctly from that color information that has been sent to the transportation vehicle 10 having automated driving capability. Accordingly, the transportation vehicle 10 having automated driving capability uses an antenna 19 as transmission/reception device to receive the driving job and the color information, in response to which an electronic controller 14 as evaluation unit prompts a rotating light 23 as illuminant to use the rotating light 23 to transmit colored light to the surroundings of the transportation vehicle 10 on the basis of the color information when the schoolchild 1 is approached to within 100 m. The user terminal 3 receives an expected time of arrival of the transportation vehicle 10 at the position 16 and the identical color information, in response to which an illuminant 6 surrounding the pushbutton 5 shines in a color corresponding to the color information. Subsequently, the user terminal 4 is also provided with an expected time of arrival of the ambulance 11 and the color information sent to the ambulance 11.

Finally, it is established that the ambulance 11 has approached the position 16 of the pensioner 2 to within approximately 100 m and, after a building 9 is passed, there is a visual axis for the pensioner 2, in response to which the rotating light 23 transmits light in a color defined by the received color information. The same applies to the illuminant 6 of the user terminal 4, as a result of which the pensioner 2 can identify the approaching ambulance 11 as intended for him and can distinguish it from the likewise approaching transportation vehicle 10 having automated driving capability. The luminous ring 6 of the user terminal 4 also shows the decreasing period before the expected time of arrival by a decreasing number of driven LEDs.

Figure 2:
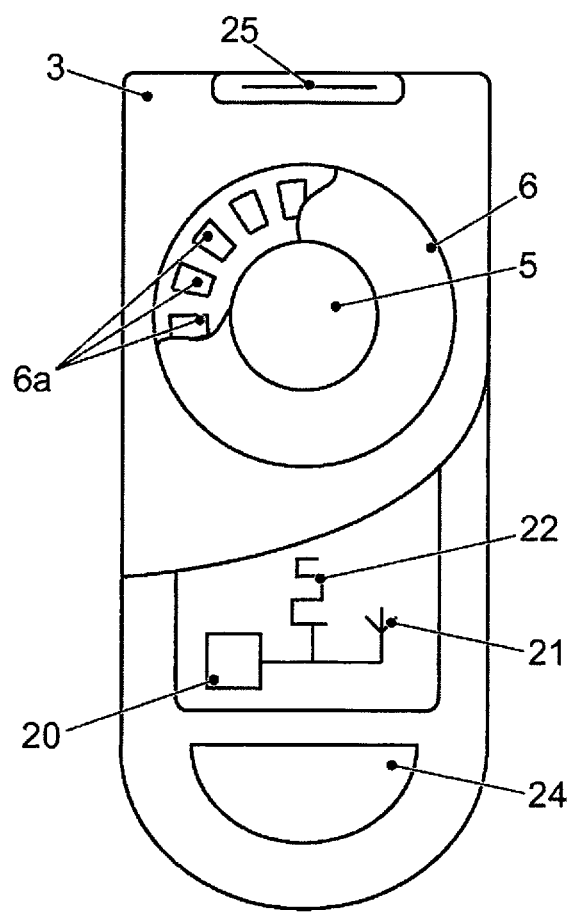
FIG. 2 shows a partially cut-away depiction of an exemplary embodiment of a disclosed user terminal.

FIG. 2 shows a partially cut-away view of an exemplary embodiment of a disclosed user terminal 3. A loop 24 allows simple and secure attachment of the user terminal 3 to the keyring, to a belt loop, or the like, of the respective user to make sure that the user cannot lose the user terminal 3. The user terminal 3 can thus be in a key fob. A pushbutton 5 as actuation device is surrounded by a luminous ring 6, the diffuser of which has a portion cut away to show LEDs 6a situated behind it, arranged in a line in a circular ring shape. The LEDs 6a are driven by \a programmable processor 20 as evaluation unit as soon as the user terminal 3 has been assigned a transportation vehicle. The programmable processor 20 can ascertain appropriate information using an antenna 22 for terrestrial mobile communication or for receiving Wi-Fi signals. There is provision for a GPS antenna 21 as position ascertainment device, the antenna likewise being connected to the programmable processor 20 for information purposes. On account of the simple hardware, which dispenses with a conventional display, an energy store (not depicted) of the user terminal 3 can end up being particularly small and can be charged quickly (e.g., inductively). The user terminal 3 can be programmed via a USB socket 25, which allows an authorized user to predefine pickup locations and destinations (in particular, on the basis of day-of-the-week and/or time-of-day windows) for the user terminal 3. Appropriate programming can naturally also take place via the antenna 22.

Figure 3:
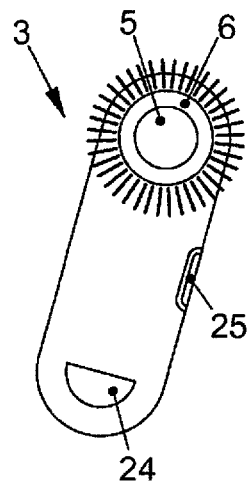
FIGS. 3-10 show different operating states of illuminants of an exemplary embodiment of a disclosed user terminal to show a waiting time or an elapsing of the waiting time.
Figure 4:
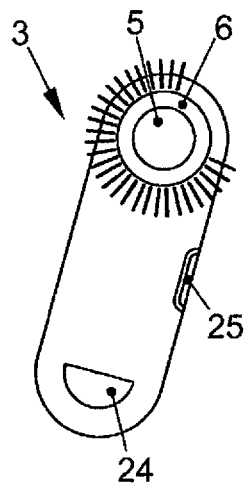
Figure 5:
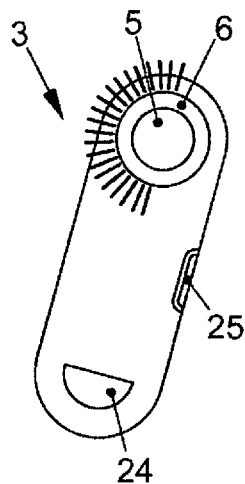
Figure 6:
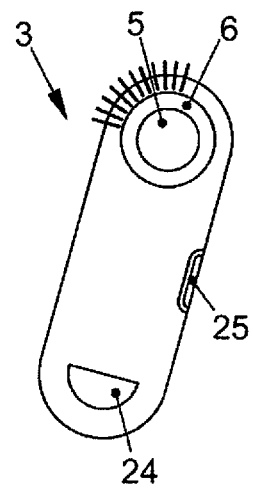
Figure 7:
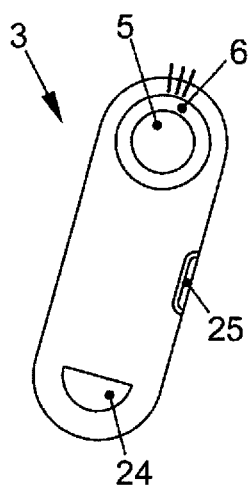
Figure 8:
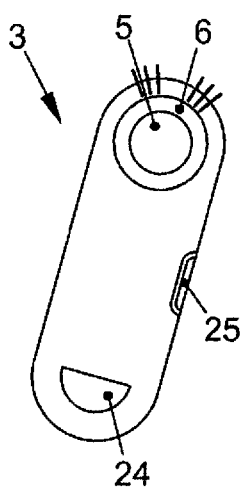
Figure 9:
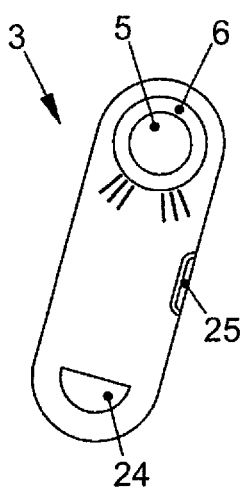
Figure 10:
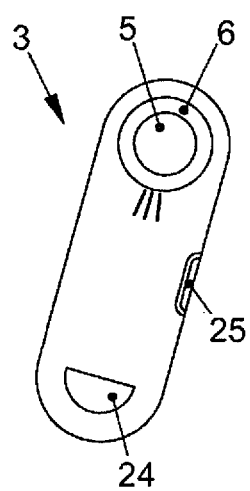

FIGS. 3 to 6 show a first exemplary embodiment of a user terminal 3, such as a key fob, the hardware of which is substantially consistent with the exemplary embodiment discussed in conjunction with FIG. 2. In FIG. 3, all of the light emitting diodes (not depicted) of the illuminant 6 are driven, which means that the ring arranged around the pushbutton 5 is completely illuminated. The number of LEDs that are on can show the waiting time statically, with a completely illuminated ring being able to represent a waiting time, e.g., of one hour, of half an hour or of a quarter of an hour, for example. FIGS. 4 to 6 show the exemplary embodiment depicted in FIG. 3, with only a portion of the illuminant 6 being on (in a manner decreasing as the ordinal number of the figure increases). The configurations depicted in each case can either be aimed at depicting the transmitted/ascertained waiting time or can depict a respective state that occurs as the waiting time elapses to an increasing extent.

FIGS. 7 to 10 show a further exemplary embodiment for the operation of a disclosed user terminal 3, in which the illuminant 6 surrounding the pushbutton 5 produces two lit positions (see FIGS. 8 and 9) that subsequently overlap/merge facing the user (FIG. 10) to show the ascertained waiting time elapsing.

Figure 11:
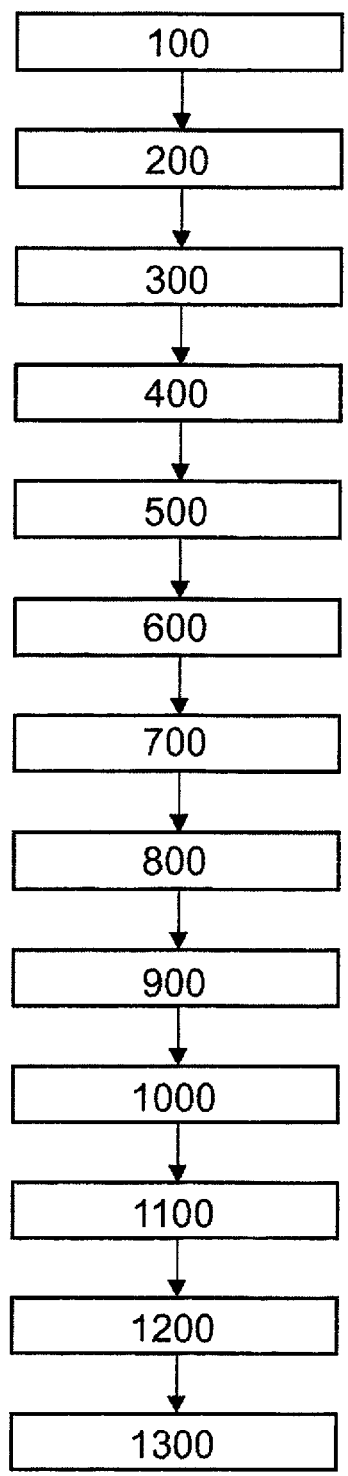
FIG. 11 shows a flowchart showing an exemplary embodiment of a disclosed method.

FIG. 11 shows an exemplary embodiment of a disclosed method for sending for a first transportation vehicle. In operation at 100, a user input is received by an actuation device of a disclosed user terminal, the actuation device being used by the user to order a transportation vehicle to a predefined position. The position can be stipulated on the basis of a time of day, for example, or defined by the current position of the user terminal. In response thereto, position determination for the first user terminal is prompted in operation at 200 to ascertain the starting point for the user's journey for the transportation vehicle. To this end, the user terminal can set up a wireless communication connection to the smartphone of the user, which comprises a locating module for satellite-based location. In operation at 300, the ascertained position is coded in data form and is sent in conjunction with a wireless message to a server of a mobility service provider in operation at 400. In operation at 500, a transportation vehicle suitable for a purpose of travel defined by the user is selected and the transportation vehicle is assigned to the user terminal. In operation at 600, an expected time of arrival or a length of time before the transportation vehicle arrives at the user terminal is subsequently ascertained.

To this end, the server can use digital map material, the positions of the transportation vehicle and of the user terminal and optionally also traffic data/traffic flow data. In operation at 700, the expected time of arrival or length of time is communicated to the user terminal. For this purpose too, it is possible for a wireless communication connection to be used and for the time/length of time to be sent to the user terminal through the mediation of a terrestrial mobile communication network/by WLAN, for example. In operation at 800, a waiting time, ascertained on the basis of the time of arrival or length of time, for which the user needs to gear himself until the transportation vehicle arrives is finally displayed by a number of lit illuminants that is predefined for the display of the waiting time.

In other words, all of the illuminants that the user terminal contains are first of all turned on and are gradually switched off in linearly descending state until the waiting time elapses, resulting in an hourglass-like behavior without any need for the user to be able to tell the time or read letters/numbers. In operation at 900, it is ascertained that the expected time of arrival has been reached. Since a short range (radio) communication signal has not yet been received by the user terminal from the transportation vehicle at this time, it is ascertained in the user terminal in operation at 900 that there is a need to update the expectable time of arrival of the transportation vehicle. In operation at 1000, a request to obtain an updated expected time of arrival is therefore transmitted by the user terminal. In response to reception of the request, the expected time of arrival is updated in the server in operation at 1100 and the updated time of arrival is taken as a basis in operation at 1200 for communicating an updated expected time of arrival or length of time to the user terminal. In operation at 1300, the number of currently lit illuminants is adapted in response thereto such that the sum of the currently lit illuminants again shows the expectable waiting time. In other words, the number of lit illuminants is chosen such that a unit of time, symbolized by a respective lit illuminant, multiplied by the number of lit illuminants gives the current waiting time.

LIST OF REFERENCE SIGNS

1 Schoolchild
2 Pensioner
3, 4 User terminal
5 Pushbutton
6 Luminous ring
6a LEDs
7 Server
8 Transmission mast
9 Building
10 Transportation vehicle having automated driving capability
11 Ambulance
12 Transportation vehicle
13 Satellite
14 Electronic controller
15 Smartphone
16 Current position of schoolchild/pensioner
17 Accommodation
18 Retirement home
19 GPS antenna
20 Programmable processor
21 GPS antenna
22 Antenna
23 Rotating light
24 Loop
25 USB socket
100-1500 Method operations

The invention claimed is:

1. A method for sending a transportation vehicle to a location of a user terminal for subsequent transport of a user associated with the user terminal to a predefined destination location, the method comprising
   receiving a user input by an actuation device of the user terminal; and
   in response thereto, sending a wireless message;
   assigning the transportation vehicle to the user terminal in response to the wireless message being received;
   ascertaining an expected time of arrival or a length of time before the transportation vehicle arrives at the location of the user terminal; and
   displaying a waiting time, ascertained based on the time of arrival or length of time, by a number of lit illuminants or number of illuminants to be switched on or off per unit time on the user terminal, which is predefined for the display of the waiting time, the number of lit illuminants or the number of illuminants to be switched on or off being a subset of a total number of the illuminants,
   wherein the predefined destination for the user is readable by the transportation vehicle and predefined in a memory of the user terminal or a server-based profile prior to sending the wireless message.

2. The method of claim 1, wherein the transportation vehicle is assigned by selecting the transportation vehicle from a plurality of transportation vehicles that are logically, initially linked to a server.

3. The method of claim 1, further comprising:
   prompting position determination of the user terminal to determine the location of the user terminal; and
   coding the ascertained position into the wireless message to define a starting location for a journey by the transportation vehicle from the starting location to the destination location.

4. The method of claim 1, further comprising communicating the expected time of arrival of the transportation vehicle or length of time until arrival of the transportation vehicle at the location of the user terminal to the user terminal.

5. The method of claim 1, wherein the illuminants comprise a plurality of LEDs arranged in a line.

6. The method of claim 1, further comprising:
updating the expected time of arrival of the transportation vehicle at the user terminal; and
based on the updated time of arrival, adapting:
the number of currently lit illuminants; or
illuminants of the user terminal that are to be switched on or off per unit time.

7. The method of claim 1, further comprising:
ascertaining that the expected time of arrival has come or the length of time or the waiting time has elapsed; and
in response thereto, sending an updated expected time of arrival or length of time to the user terminal.

8. The method of claim 7, further comprising sending a request to obtain an updated expected time of arrival or length of time by the user terminal.

9. The method of claim 1, wherein the actuation device includes an order button configured in hardware.

10. A user terminal comprising:
an actuation device;
a transmission or reception device;
an evaluation unit; and
illuminants,
wherein the evaluation unit is configured to receive a user input in response to actuation of the actuation device of the user terminal,
wherein the transmission or reception device is configured to respond receipt of the user input by the evaluation unit by:
sending a wireless message to send for a transportation vehicle to a location of a user terminal for subsequent transport of a user associated with the user terminal to a predefined destination location, and
obtaining an acknowledgement of an assignment of the transportation vehicle to the user terminal, made in response to the wireless message, and a message regarding an expected time of arrival or a length of time before the transportation vehicle arrives at the location of the user terminal,
wherein, based on the time of arrival or length of time, the illuminant displays a waiting time, ascertained based on the time of arrival or length of time, by a number of lit illuminants, a number of illuminants to be switched on or off per unit time which is predefined for the display of the waiting time, the number of lit illuminants or the number of illuminants to be switched on or off being a subset of a total number of the illuminants and
wherein the predefined destination for the user is readable by the transportation vehicle and predefined in a memory of the user terminal or a server-based profile prior to the wireless message being sent.

11. A non-transitory computer program product comprising instructions that, when executed on an evaluation unit of a user terminal, prompt the evaluation unit to perform a method for sending a transportation vehicle to a location of a user terminal for subsequent transport of a user associated with the user terminal to a predefined destination location, the method comprising:
storing the predefined destination for the user in a memory of the user terminal or a server-based profile readable by an assigned transportation vehicle,
receiving a user input by an actuation device of the user terminal; and
in response thereto, sending a wireless message, wherein the predefined destination is stored prior to sending the wireless message;
assigning the transportation vehicle to the user terminal in response to the wireless message being received;
ascertaining an expected time of arrival or a length of time before the transportation vehicle arrives at the user terminal; and
displaying a waiting time, ascertained based on the time of arrival or length of time, by a number of lit illuminants or number of illuminants to be switched on or off per unit time on the user terminal, which is predefined for the display of the waiting time, the number of lit illuminants or the number of illuminants to be switched on or off being a subset of a total number of the illuminants.

12. The user terminal of claim 11, wherein the user terminal is a key fob.

* * * * *